United States Patent
Kim

(10) Patent No.: US 12,537,661 B2
(45) Date of Patent: Jan. 27, 2026

(54) PHASE INTERPOLATOR, CLOCK DATA RECOVERER, COMMUNICATION DEVICE, AND OPERATING METHOD OF PHASE INTERPOLATOR

(71) Applicant: Samsung Electronics Co., Ltd., Suwon-si (KR)

(72) Inventor: Yongwoo Kim, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 18/786,539

(22) Filed: Jul. 28, 2024

(65) Prior Publication Data

US 2025/0254020 A1  Aug. 7, 2025

(30) Foreign Application Priority Data

Feb. 2, 2024  (KR) .................. 10-2024-0016909

(51) Int. Cl.
*H04L 7/00* (2006.01)
*H03K 5/13* (2014.01)

(52) U.S. Cl.
CPC ............. *H04L 7/0025* (2013.01); *H03K 5/13* (2013.01)

(58) Field of Classification Search
CPC ................ H03K 5/13; H03K 5/131; H03K 2005/00052; H04L 7/0025; H04L 7/0337
See application file for complete search history.

(56) References Cited

U.S. PATENT DOCUMENTS

| | | | |
|---|---|---|---|
| 7,615,596 B2 * | 11/2009 | Burns | ................ B01J 19/2435 502/103 |
| 8,704,568 B1 | 4/2014 | Zhu et al. | |
| 8,704,583 B2 | 4/2014 | Bulzacchelli et al. | |
| 8,786,346 B2 | 7/2014 | Yanagisawa | |
| 8,873,689 B2 | 10/2014 | Chung et al. | |
| 9,025,654 B1 | 5/2015 | Su et al. | |
| 9,806,915 B1 | 10/2017 | Elzeftawi et al. | |

(Continued)

FOREIGN PATENT DOCUMENTS

| | | |
|---|---|---|
| KR | 10-2022-0100182 A | 7/2022 |
| KR | 10-2471135 B1 | 11/2022 |
| KR | 10-2023-0047824 A | 4/2023 |

OTHER PUBLICATIONS

Gangasani et al., A 16 GB/s Backplane Transceiver With 12 Tap Current Integrating DFE and Dynamic Adaptation of Voltage Offset and Timing Drifts in 45 nm SOI CMOS Technology, Aug. 2012, vol. 47, No. 8, IEEE Journal of Solid-State Circuits.

*Primary Examiner* — Dac V Ha
(74) *Attorney, Agent, or Firm* — Muir Patent Law, PLLC

(57) ABSTRACT

A phase interpolator includes a decoder, a digital-to-analog converter, and a first phase mixer. The decoder is configured to output a digital signal based on a control signal. The digital-to-analog converter is configured to, based on a first current, a second current, and the digital signal, adjust first to third weight signals among a plurality of target weight signals and to output the first to third weight signals. The first phase mixer is configured to determine first and second target clock signals among a plurality of input clock signals, and based on the first to third weight signals, generate a first output clock signal having a phase between the first and second target clock signals as a phase interpolation clock signal.

20 Claims, 15 Drawing Sheets

(56) References Cited

U.S. PATENT DOCUMENTS

| | | |
|---|---|---|
| 10,411,684 B2 * | 9/2019 | Quek ................ H03M 1/86 |
| 10,715,358 B1 | 7/2020 | Zhang et al. |
| 10,749,504 B2 | 8/2020 | Pi et al. |
| 10,855,294 B2 | 12/2020 | Haroun et al. |
| 11,569,804 B1 | 1/2023 | Lee et al. |
| 11,675,386 B2 * | 6/2023 | Chong ............ H04L 7/0025 |
| | | 713/400 |
| 11,757,437 B2 | 9/2023 | Son et al. |
| 11,916,561 B1 * | 2/2024 | Hu ................ H03M 1/0624 |
| 2023/0114988 A1 | 4/2023 | Kim et al. |

* cited by examiner

PHASE INTERPOLATOR, CLOCK DATA RECOVERER, COMMUNICATION DEVICE, AND OPERATING METHOD OF PHASE INTERPOLATOR

CROSS-REFERENCE TO RELATED APPLICATION(S)

This application is based on and claims priority under 35 U.S.C. § 119 to Korean Patent Application No. 10-2024-0016909, filed on Feb. 2, 2024, in the Korean Intellectual Property Office, the disclosure of which is incorporated by reference herein in its entirety.

BACKGROUND

The inventive concept relates to a phase interpolator, and specifically, to a phase interpolator for improving linearity, a clock data recoverer, a communication device, and an operating method of the phase interpolator.

Despite the improvements in the speeds and data transfer rates of peripheral devices such as memory, communication devices, or graphics devices, the operating speeds of peripheral devices may not catch up with the operating speeds of the processors, and there is always a speed difference between new processors and peripheral devices. Therefore, in a high-performance digital system, significant speed improvements of peripheral devices are required. For example, in an input/output method for transmitting data in synchronization with a clock signal, such as data transmission between a memory device and a memory controller, it is very important to achieve time synchronization between a clock signal and data as a load of a bus increases and a transmission frequency is increased. Circuits that may be used for this purpose include phase locked loop (PLL) circuits, delay locked loop (DLL) circuits, etc. These phase locked loop circuits and delay locked loop circuits are generally provided with phase interpolators. A phase interpolator is a circuit that appropriately controls the select delay clock signals of two different phases to generate any delay clock signal between the two select delay clock signals. The phase interpolator is used in various application circuits because the phase interpolator may precisely output a desired phase.

A skew may occur between input clock signals, which are input to the phase interpolator. In this case, nonlinearity may occur in the output of the phase interpolator, and jitter of the system may increase. A phase interpolator including a controllable delay cell to remove this skew and a multi-stage phase interpolator that sequentially interpolates input clock signals in multiple stages have been devised. However, since controllable delay cell-based phase interpolators cannot detect skew in real time, their accuracy is somewhat low, and multi-stage phase interpolators have a large area and consume a relatively large amount of power. Therefore, research is needed on phase interpolators that consume relatively little power without increasing the area.

SUMMARY

The inventive concept provides a phase interpolator configured to improve linearity, reliability, and accuracy with a relatively small area, and to reduce power consumption, a clock data recoverer, a communication device, and a method of operating the phase interpolator.

According to an aspect of the inventive concept, there is provided a phase interpolator including a decoder, a digital-to-analog converter (DAC), and a first phase mixer. The decoder is configured to output a digital signal, based on a control signal. the DSC is configured to, based on a first current, a second current, and the digital signal, adjust first to third weight signals among a plurality of target weight signals, and output the first to third weight signals. The first phase mixer is configured to determine first and second target clock signals among a plurality of input clock signals, and based on the first to third weight signals, generate a first output clock signal having a phase between the first and second target clock signals.

According to another aspect of the inventive concept, there is provided a clock data recoverer including a phase interpolator, a data sampler, and a clock data restoring loop controller. The phase interpolator is configured to generate a phase interpolation clock signal, based on a control signal and a plurality of input clock signals. The data sampler is configured to, based on the phase interpolation clock signal, sample an input data stream and to generate sample data. The clock data restoring loop controller is configured to, based on a sampling result of the data sampler, output the control signal. The phase interpolator includes a decoder, a digital-to-analog converter (DAC), and a first phase mixer. The decoder is configured to output a digital signal, based on a control signal. The digital-to-analog converter is configured to, based on a first current, a second current, and the digital signal, adjust first to third weight signals among a plurality of target weight signals and output the first to third weight signals. The first phase mixer is configured to determine first and second target clock signals among a plurality of input clock signals, and based on the first to third weight signals, generate a first output clock signal having a phase between the first and second target clock signals as the phase interpolation clock signal.

According to another aspect of the inventive concept, there is provided a communication device including a clock generator, a phase interpolator, and a data sampler. The clock generator is configured to generate a plurality of input clock signals, based on a crystal reference clock signal received from the outside. The phase interpolator is configured to generate a phase interpolation clock signal, based on a control signal and the plurality of input clock signals. The data sampler is configured to, based on the phase interpolation clock signal, sample an input data stream, and generate sample data. The phase interpolator includes a decoder, a digital-to-analog converter, and a first phase mixer. The decoder is configured to output a digital signal, based on a control signal. The digital-to-analog converter is configured to, based on a first current, a second current, and the digital signal, adjust first to third weight signals among a plurality of target weight signals, and output the first to third weight signals. The first phase mixer is configured to determine first and second target clock signals among a plurality of input clock signals, and based on the first to third weight signals, generate a first output clock signal having a phase between the first and second target clock signals as the phase interpolation clock signal.

According to another aspect of the inventive concept, there is provided an operating method of a phase interpolator. The method includes outputting a digital signal based on a control signal, adjusting first to third weight signals among a plurality of target weight signals based on a first current, a second current, and a digital signal, and generating a first output clock signal having a phase between first and second target clock signals among a plurality of input clock signals based on the first to third weight signals.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the inventive concept will be described in detail with reference to the accompanying drawings.

Figure 1:
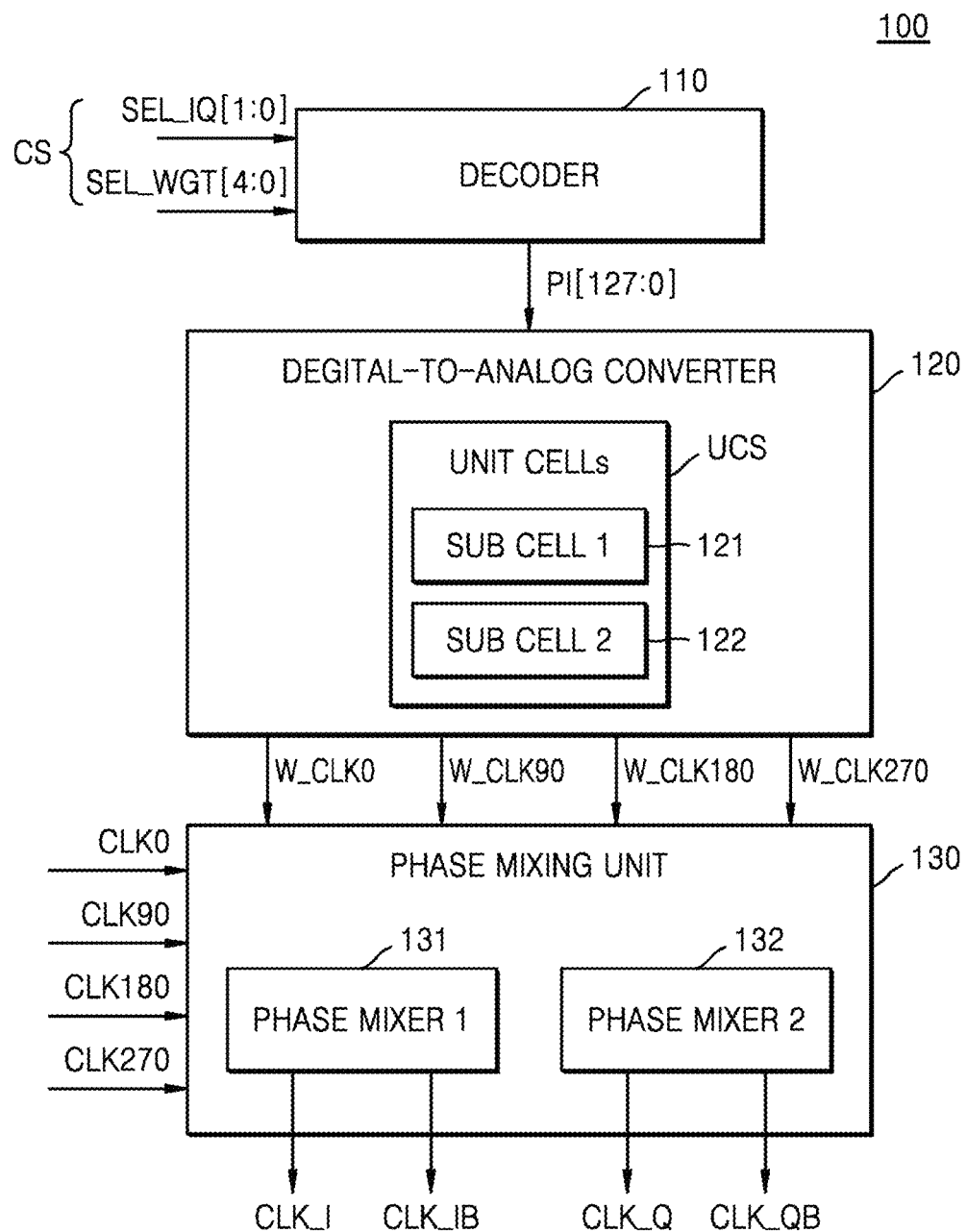
FIG. 1 is a block diagram of a phase interpolator according to according to example embodiments.

FIG. 1 is a block diagram of a phase interpolator 100 according to according to example embodiments.

Referring to FIG. 1, a phase interpolator 100 may include a decoder 110, a digital-to-analog converter (DAC) 120, and a phase mixing unit 130.

The decoder 110 may output a digital signal PI[127:0] based on a control signal CS. In an embodiment, the control signal CS includes 7 bits, and may include a first selection signal SEL_IQ[1:0] and a second selection signal SEL_WGT[4:0]. The control signal CS according to an embodiment may be referred to as a phase interpolation code. The first selection signal SEL_IQ[1:0] may be a signal or a digital code for selecting or indicating a phase interpolation window. The phase interpolation window may refer to a quadrant determined by two input clock signals having a phase difference of 90 degrees from among first to fourth input clock signals CLK0, CLK90, CLK180, and CLK270. The first selection signal SEL_IQ[1:0] according to an embodiment may consist of two bits, and a specific quadrant may be determined according to a bit value of the first selection signal SEL_IQ[1:0]. The second selection signal SEL_WGT[4:0] may be a signal for selecting unit cells UCS of the DAC 120 to adjust the degree of phase interpolation. According to an embodiment, the second selection signal SEL_WGT[4:0] may consist of 5 bits, and according to bit values of the second selection signal SEL_WGT[4:0], the number of cases of selecting specific unit cells may be determined to be 32. However, embodiments are not limited to the example described above, and the number of bits of the second selection signal SEL_WGT[4:0] may be set according to the number of unit cells UCS. The digital signal PI[127:0] according to an embodiment may consist of 128 bits, and a 4-bit unit signal may be provided to each of the unit cells UCS. However, embodiments are not limited to the example described above.

The DAC 120 may adjust first to third weight signals among first to fourth target weight signals W_CLK0, W_CLK90, W_CLK180, and W_CLK270 based on a first current, a second current (not illustrated), and a digital signal PI[127:0]. In an embodiment, the magnitude of each of the first current and the second current may be half of a unit current (e.g., I_UNIT). For example, the unit current is a current of each of the unit cells UCS. A difference between the phase of the first current and the phase of the second current according to an embodiment may be 90 degrees. For example, the phase of the first current may precede (lead) or may be delayed (lagged) by 90 degrees from the phase of the second current. However, embodiments are not limited to the example described above. The first to third weight signals may be signals for assigning different weights to the two selected input clock signals. The first to third weight signals may have a phase difference of 90 degrees with respect to any one signal (e.g., a first weight signal). For example, a phase difference between the first and second weight signals may be 90 degrees, and a phase difference between the first and third weight signals may be 90 degrees. Referring to FIG. 1, for example, the first weight signal may be a first target weight signal W_CLK0, the second weight signal may be a second target weight signal W_CLK90, and the third weight signal may be a fourth target weight signal W_CLK270. However, embodiments are not limited to the example described above. The DAC 120 may output the first to third weight signals to the phase mixing unit 130.

In one embodiment, the DAC 120 may include a plurality of unit cells UCS, and each of the plurality of unit cells UCS may include a first sub-cell 121 and a second sub-cell 122. The first sub-cell 121 may output the first and second weight signals based on the first current and the digital signal PI[127:0]. The second sub-cell 122 may output the first and third weight signals based on the second current and the digital signal PI[127:0].

In an embodiment, the number of unit cells UCS may be correlated with the number of bits of each of the second selection signal SEL_WGT[4:0] and the digital signal PI[127:0]. The number of bits of each of the second selection signal SEL_WGT[4:0] and the digital signal PI[127:0] may be set according to the number of unit cells UCS. For example, the number of unit cells UCS may be 32, the number of bits of the second selection signal SEL_WGT[4:0] may be 5, and the number of bits of the digital signal PI[127:0] may be 128. However, embodiments are not limited to the example described above.

The phase mixing unit 130 may receive the first to fourth input clock signals CLK0, CLK90, CLK180, and CLK270. The phase mixing unit 130 may determine two input clock signals forming a quadrant selected by the first selection signal SEL_IQ[1:0] among the first to fourth input clock signals CLK0, CLK90, CLK180, and CLK270. The phase mixing unit 130 may perform a phase interpolation operation based on the first to third weight signals to generate an output clock signal having a phase between two input clock signals. The phase interpolation method may be a method for generating a clock signal having a phase within a phase range of two input clock signals having different phases. For example, a clock signal having a phase within a range of 0 degrees to 90 degrees may be generated using an input clock signal having a phase of 0 degrees and an input clock signal having a phase of 90 degrees. The output clock signal may be referred to as a phase interpolation clock signal.

In an embodiment, the phase mixing unit 130 may include a first phase mixer 131 and a second phase mixer 132. The first phase mixer 131 may determine first and second target clock signals among the first to fourth input clock signals CLK0, CLK90, CLK180, and CLK270, and output a first output clock signal CLK_I and a first inverted output clock signal CLK_IB having a phase between the first and second target clock signals based on the first to third weight signals. The second phase mixer 132 may determine third and fourth target clock signals among the first to fourth input clock signals CLK0, CLK90, CLK180, and CLK270, and output a second output clock signal CLK_Q and a second inverted output clock signal CLK_QB having a phase between the third and fourth target clock signals based on the first to third weight signals. The phase of the second output clock signal CLK_Q may precede (lead) by 90 degrees from the phase of the first output clock signal CLK_I.

According to the embodiment described above, there is an effect of improving the linearity of the phase interpolator 100 by removing the clock skew between the two selected input clock signals.

Furthermore, according to the embodiment described above, effects of implementing a phase interpolator 100 with a relatively small area, promoting integration of the phase interpolator 100, and improving the reliability and accuracy of the phase interpolator 100 is achieved by removing the influence of the clock skew in real time without increasing the area of the phase interpolator 100.

In addition, according to the embodiment described above, by removing the influence of the clock skew without additional power consumption, there is an effect of reducing the power consumption of the phase interpolator 100.

Figure 2:
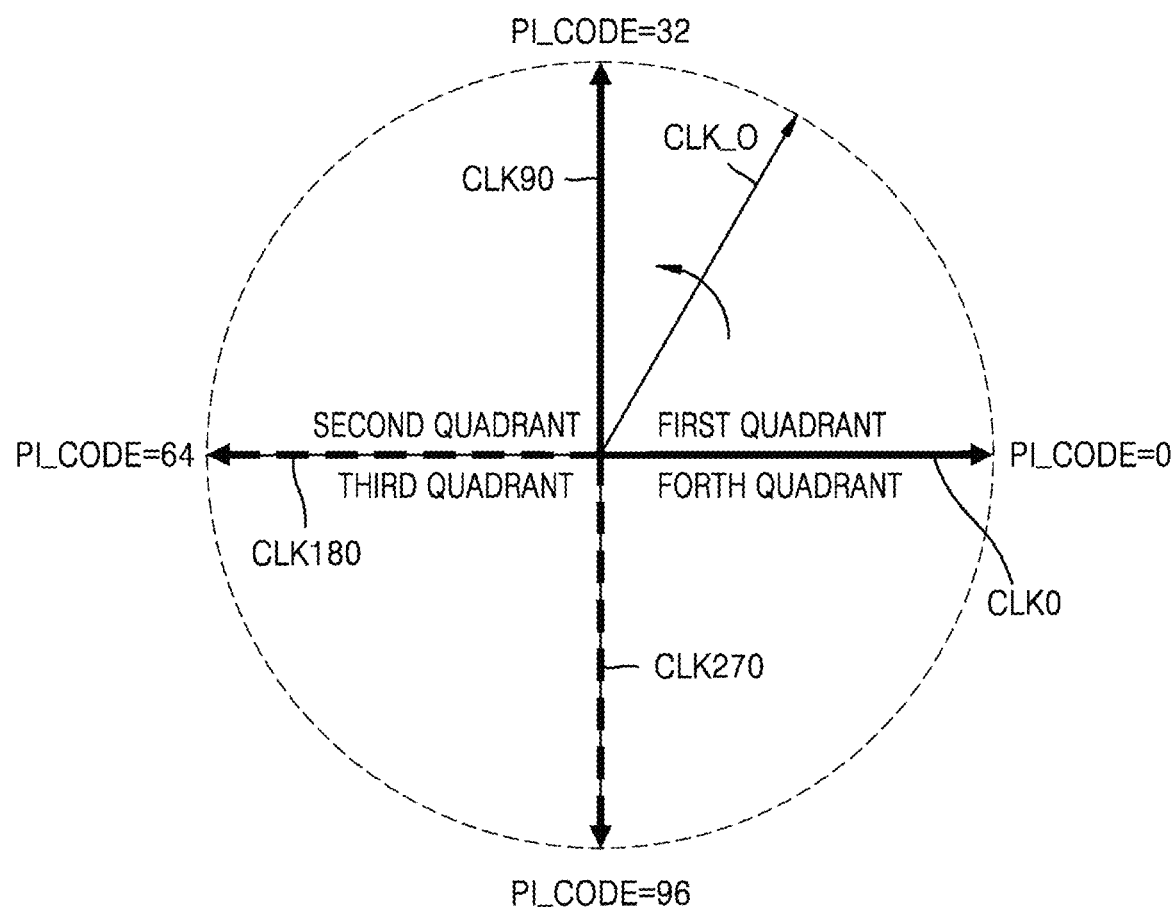
FIG. 2 is a diagram illustrating operation of the phase interpolator of FIG. 1 according to example embodiments.

FIG. 2 is a diagram illustrating operation of the phase interpolator 100 of FIG. 1 according to example embodiments.

Referring to FIG. 2, a phase interpolation code PI_CODE of FIG. 2 may correspond to the control signal CS of FIG. 1. The value of the phase interpolation code PI_CODE is a decimal number, and may be any one value from 0 to 127. In this case, a value of the first selection signal SEL_IQ[1:0] may be "00", "01", "10", or "11" as a binary number, and a value of the second selection signal SEL_WGT[4:0] may be any one of binary numbers from "00000" to "11111".

In the first selection signal SEL_IQ[1:0], "00", "01", "10", and "11" may indicate two input clock signals constituting one phase interpolation window, respectively. For example, when the value of the phase interpolation code PI_CODE is a decimal number from 0 to 31, the value of the first selection signal SEL_IQ[1:0] may be "11", and the first and second input clock signals CLK0 and CLK90 may be selected to perform the phase interpolation operation in the first quadrant FIRST QUADRANT. For example, when the value of the phase interpolation code PI_CODE is 0 as a decimal number, an output clock signal CLK_O having the same phase as the first input clock signal CLK0 is generated, and whenever the value of the phase interpolation code PI_CODE increases by 1 as a decimal number, the value of the second selection signal SEL_WGT[4:0] increases sequentially from "00000" to "11111", and an output clock signal CLK_O having a phase increased by about 90/32 degrees based on the first input clock signal CLK0 may be generated. The output clock signal CLK_O may be, for example, the first output clock signal CLK_I, but embodiments are not limited to the example described above. Meanwhile, similarly, when the value of the phase interpolation code PI_CODE is 32 to 63 in decimal, the value of the first selection signal SEL_IQ[1:0] may be "10" in binary, and the second and third input clock signals CLK90 and CLK180 may be selected to perform the phase interpolation operation in the second quadrant SECOND QUADRANT. When the value of the phase interpolation code PI_CODE is from 64 to 95 in decimal, the value of the first selection signal SEL_IQ[1:0] may be "00" in binary, and the third and fourth input clock signals CLK180 and CLK270 may be selected to perform the phase interpolation operation in the third quadrant THIRD QUADRANT. When the value of the phase interpolation code PI_CODE is 96 to 127 in decimal, the value of the first selection signal SEL_IQ[1:0] may be "01" in binary, and the fourth and first input clock signals CLK270 and CLK0 may be selected to perform a phase interpolation operation in the fourth quadrant FORTH QUADRANT. The value of the first selection signal SEL_IQ[1:0] according to the value of the phase interpolation code PI_CODE is not limited to the example described above.

The first to fourth input clock signals CLK0, CLK90, CLK180, and CLK270 described above with reference to FIG. 2 may be signals having no phase skew (or clock skew) therebetween.

Figure 3:
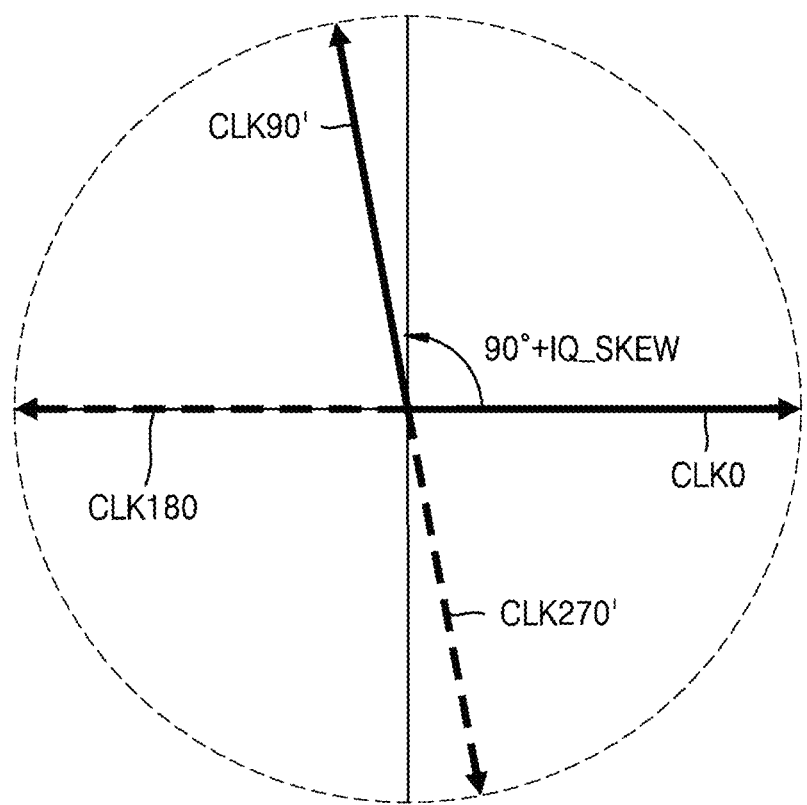
FIG. 3 is a diagram illustrating a phase skew of input clock signals according to example embodiments.

FIG. 3 is a diagram illustrating a phase skew of input clock signals according to example embodiments.

Referring to FIG. 3, a phase skew IQ_SKEW may occur among the first to fourth input clock signals CLK0, CLK90', CLK180, and CLK270'. For example, each of a phase difference between the first and second input clock signals CLK0 and CLK90' and a phase difference between the third and fourth input clock signals CLK180 and CLK270' may be generated more by the phase skew IQ_SKEW at 90 degrees. In addition, each of a phase difference between the second and third input clock signals CLK90' and CLK180 and a phase difference between the fourth and first input clock signals CLK270' and CLK0 may be generated less by the phase skew IQ_SKEW at 90 degrees. As described above, when the phase skew IQ_SKEW occurs in the phase interpolator 100, nonlinearity may occur in the output (e.g., the output clock signal CLK_O) of the phase interpolator 100, and jitter that may occur in the entire system including the phase interpolator 100 may increase.

Figure 4:
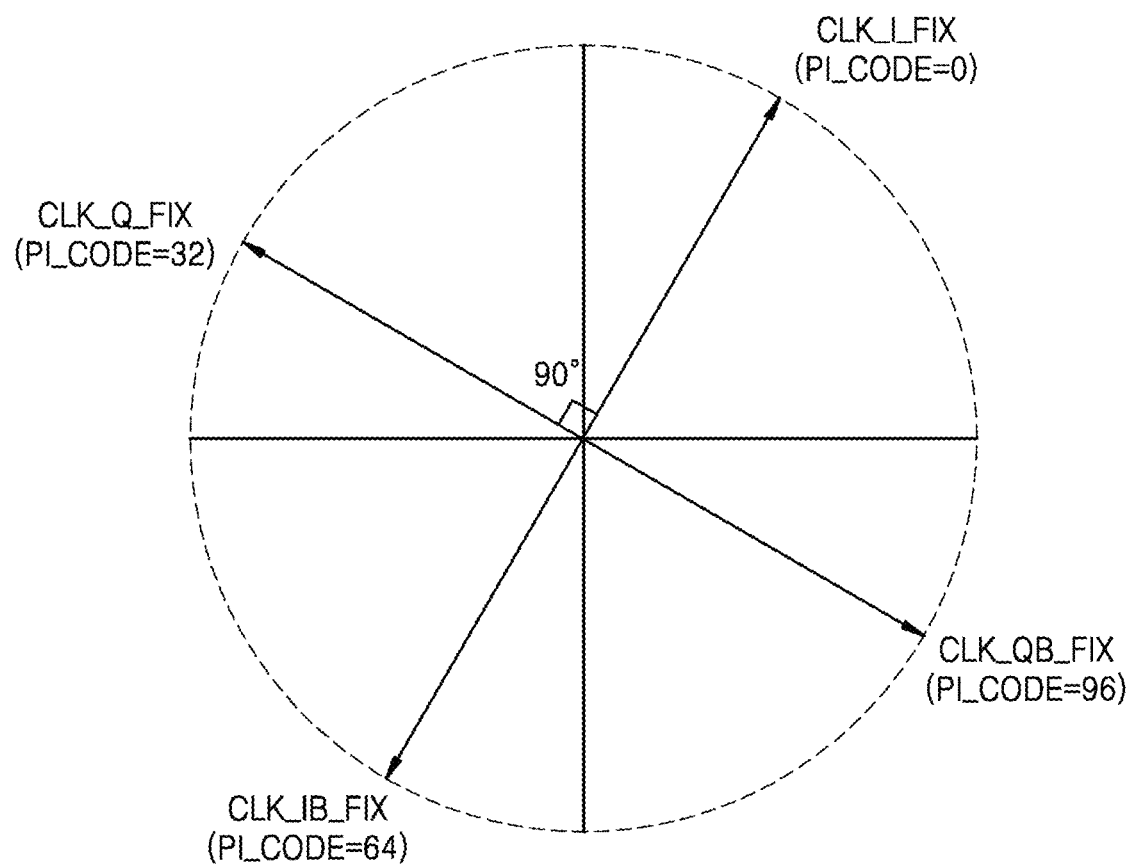
FIG. 4 is a diagram illustrating virtual reference clock signals according to example embodiments.

FIG. 4 is a diagram illustrating virtual reference clock signals according to example embodiments.

Referring to FIGS. 1, 2, 3, and 4, when the phase skew IQ_SKEW occurs in the first to fourth input clock signals CLK0, CLK90', CLK180, and CLK270', the phase interpolator 100 may set virtual first to fourth reference clock signals CLK_I_FIX, CLK_Q_FIX, CLK_IB_FIX, and CLK_QB_FIX having a phase difference of 90 degrees from each other. The first reference clock signal CLK_I_FIX corresponds to a case where the value of the phase interpolation code PI_CODE is 0 as a decimal number, the second reference clock signal CLK_Q_FIX corresponds to a case where the value of the phase interpolation code PI_CODE is 32 as a decimal number, the third reference clock signal CLK_IB_FIX may correspond to a case where the value of the phase interpolation code PI_CODE is 64 as a decimal number, and the fourth reference clock signal CLK_QB_FIX may correspond to a case where the value of the phase interpolation code PI_CODE is 96 as a decimal number. For example, virtual phase interpolation windows may be set by the first to fourth reference clock signals CLK_I_FIX, CLK_Q_FIX, CLK_IB_FIX, and CLK_QB_FIX.

Figure 5:
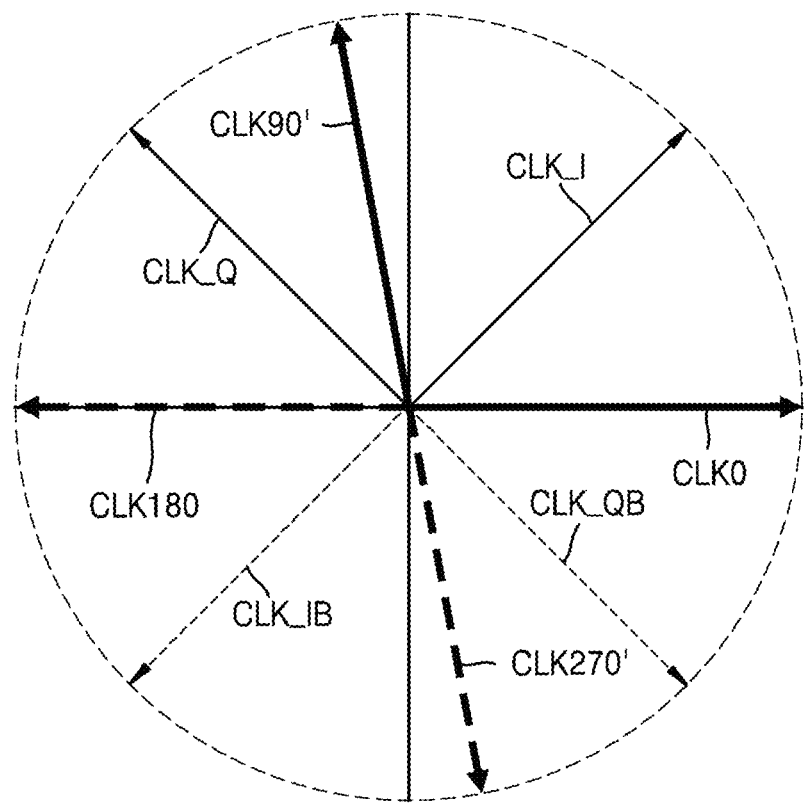
FIG. 5 is a diagram illustrating output clock signals according to example embodiments.

FIG. 5 is a diagram illustrating output clock signals according to example embodiments.

Referring to FIGS. 4 and 5, even if the phase skew IQ_SKEW occurs in the first to fourth input clock signals CLK0, CLK90', CLK180, and CLK270', the phase interpolator 100 may output clock signals (e.g., CLK_I, CLK_Q, CLK_IB, and CLK_QB) based on the first to fourth reference clock signals (e.g., CLK_I_FIX, CLK_Q_FIX, CLK_IB_FIX, and CLK_QB_FIX). Accordingly, it is possible to remove the detected phase skew IQ_SKEW while tracking the phase skew IQ_SKEW among the input clock signals in real time without increasing the area of the phase interpolator 100 and without increasing the power consumption of the phase interpolator 100.

Figure 6:
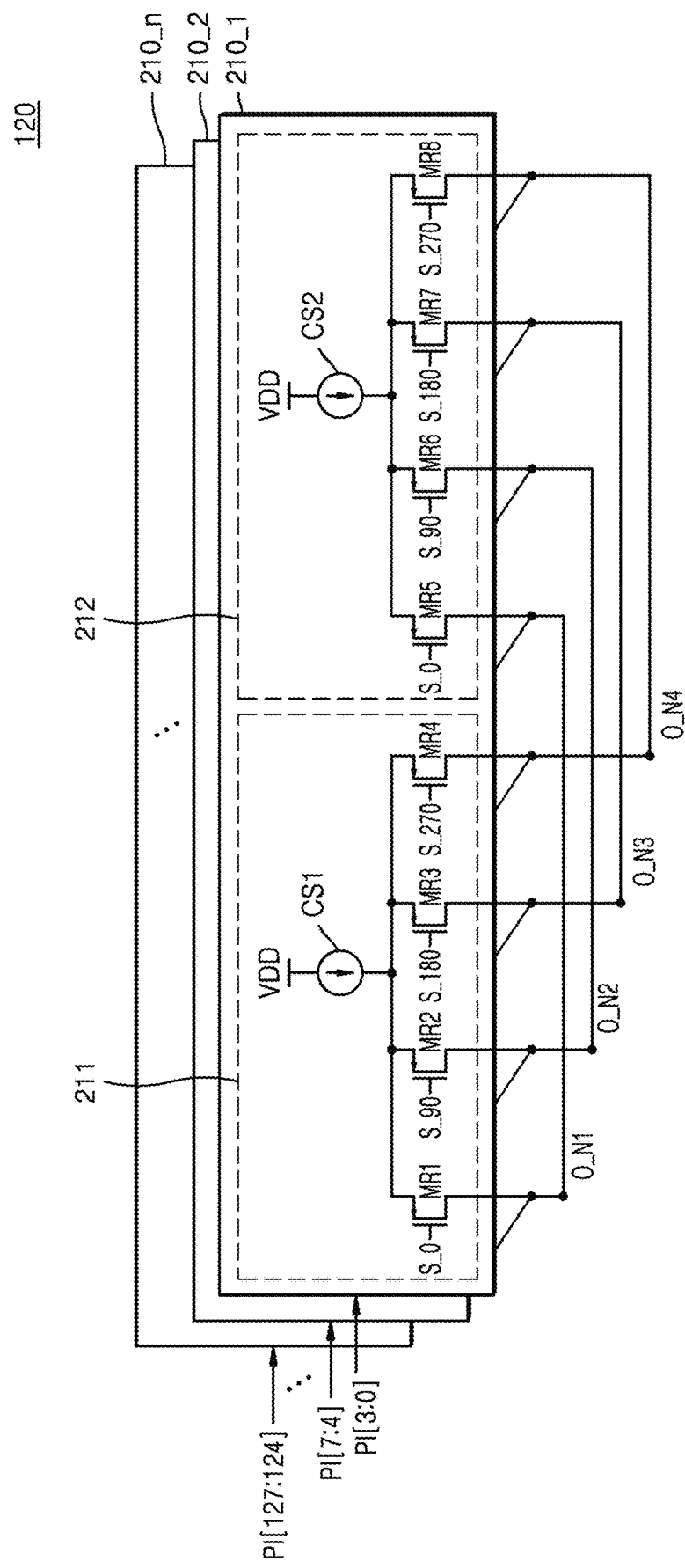
FIG. 6 is a diagram illustrating an example of a digital-to-analog converter included in the phase interpolator of FIG. 1 according to example embodiments.

FIG. 6 is a diagram illustrating an example of the DAC 120 included in the phase interpolator 100 of FIG. 1, according to example embodiments.

Referring to FIG. 6, the DAC 120 may include first to n-th unit cells 210_1 to 210_n. n may be an integer of 2 or more, for example, 32, but embodiments are not limited to the examples described above.

Each of the first to n-th unit cells 210_1 to 210_n may receive a 4-bit signal from the digital signal PI[127:0]. For example, the first unit cell 210_1 may receive a signal PI[3:0], the second unit cell 210_2 may receive a signal PI[7:4], and the n-th unit cell 210_n may receive a signal PI[127:124].

Some unit cells of the first to n-th unit cells 210_1 to 210_n may output first and second weight signals, and the remaining unit cells of the first to n-th unit cells 210_1 to 210_n may output first and third weight signals. The number of some unit cells among the first to n-th unit cells 210_1 to 210_n and the number of remaining unit cells may be determined according to the value of the second selection signal SEL_WGT[4:0]. Some unit cells may be referred to as first unit cells for convenience, and the remaining unit cells may be referred to as second unit cells for convenience.

Each of the first to n-th unit cells 210_1 to 210_n may include a first sub-cell 211 and a second sub-cell 212. When n is 32, the total number of first sub-cells 211 included in the DAC 120 may also be 32, and the total number of second sub-cells 212 included in the DAC 120 may also be 32.

The first sub-cell 211 may include a first current source CS1 and first to fourth transistors MR1, MR2, MR3, and MR4. The first current source CS1 may output a first current based on a power supply voltage VDD. One of the first to fourth transistors MR1, MR2, MR3, and MR4 may be selected and turned on, and the first current source CS1 may be electrically connected to each output node. The first to fourth transistors MR1, MR2, MR3, and MR4 may be implemented as a P-type transistor, a P-type FET, or a PMOSFET, but are not limited to the embodiments described above. The first to fourth transistors MR1, MR2, MR3, and MR4 may be connected between the first current source CS1 and the respective first to fourth output nodes O_N1, O_N2, O_N3, and O_N4, and may be turned on or off based on first to fourth on/off signals. For example, the first transistor MR1 may be connected to the first current source CS1 and the first output node O_N1, and may be turned on or off according to a first on/off signal S_0. The second transistor MR2 may be connected to the first current source CS1 and the second output node O_N2, and may be turned on or off according to a second on/off signal S_90. The third transistor MR3 may be connected to the first current source CS1 and the third output node O_N3, and may be turned on or off according to a third on/off signal S_180. The fourth transistor MR4 may be connected to the first current source CS1 and the fourth output node O_N4, and may be turned on or off according to a fourth on/off signal S_270. The first to fourth on/off signals S_0, S_90, S_180, and S_270 may correspond to four bits in the digital signal PI[127:0]. The first to fourth transistors MR1, MR2, MR3, and MR4 may be included in a first transistor group.

The second sub-cell 212 may include a second current source CS2 and fifth to eighth transistors MR5, MR6, MR7, and MR8. The second current source CS2 may output a second current based on the power supply voltage VDD. The magnitude of the second current may be the same as the magnitude of the first current, and the magnitude of the first current and the magnitude of the second current may be ½ times the unit current. According to an embodiment, the difference between the phase of the first current and the phase of the second current may be 90 degrees. One of the fifth to eighth transistors MR5, MR6, MR7, and MR8 may be selected and turned on, and the second current source CS2 may be electrically connected to each output node. The fifth to eighth transistors MR5, MR6, MR7, and MR8 may be implemented as a P-type transistor, a P-type FET, or a PMOSFET, but are not limited to the embodiments described above. The fifth to eighth transistors MR5, MR6, MR7, and MR8 may be connected between the second current source CS2 and the respective first to fourth output nodes O_N1, O_N2, O_N3, and O_N4 to be turned on or off based on the first to fourth on/off signals. For example, the fifth transistor MR5 may be turned on or off according to a first on/off signal S_0. The sixth transistor MR6 may be turned on or off according to a second on/off signal S_90. The seventh transistor MR7 may be turned on or off according to a third on/off signal S_180. The eighth transistor MR8 may be turned on or off according to a fourth on/off signal S_270. The fifth to eighth transistors MR5, MR6, MR7, and MR8 may be included in a second transistor group. In an embodiment, bits of the first on/off signal S_0 that is input to the first sub-cell 211 may be different from bits of the first on/off signal S_0 that is input to the second sub-cell 212, bits of the second on/off signal S_90 that is input to the first sub-cell 211 may be different from bits of the second on/off signal S_90 that is input to the second sub-cell 212, bits of the third on/off signal S_180 that is input to the first sub-cell 211 may be different from bits of the third on/off signal S_180 that is input to the second sub-cell 212, and bits of the fourth on/off signal S_270 that is input to the first sub-cell 211 may be different from bits of the fourth on/off signal S_270 that is input to the second sub-cell 212.

Figure 7:
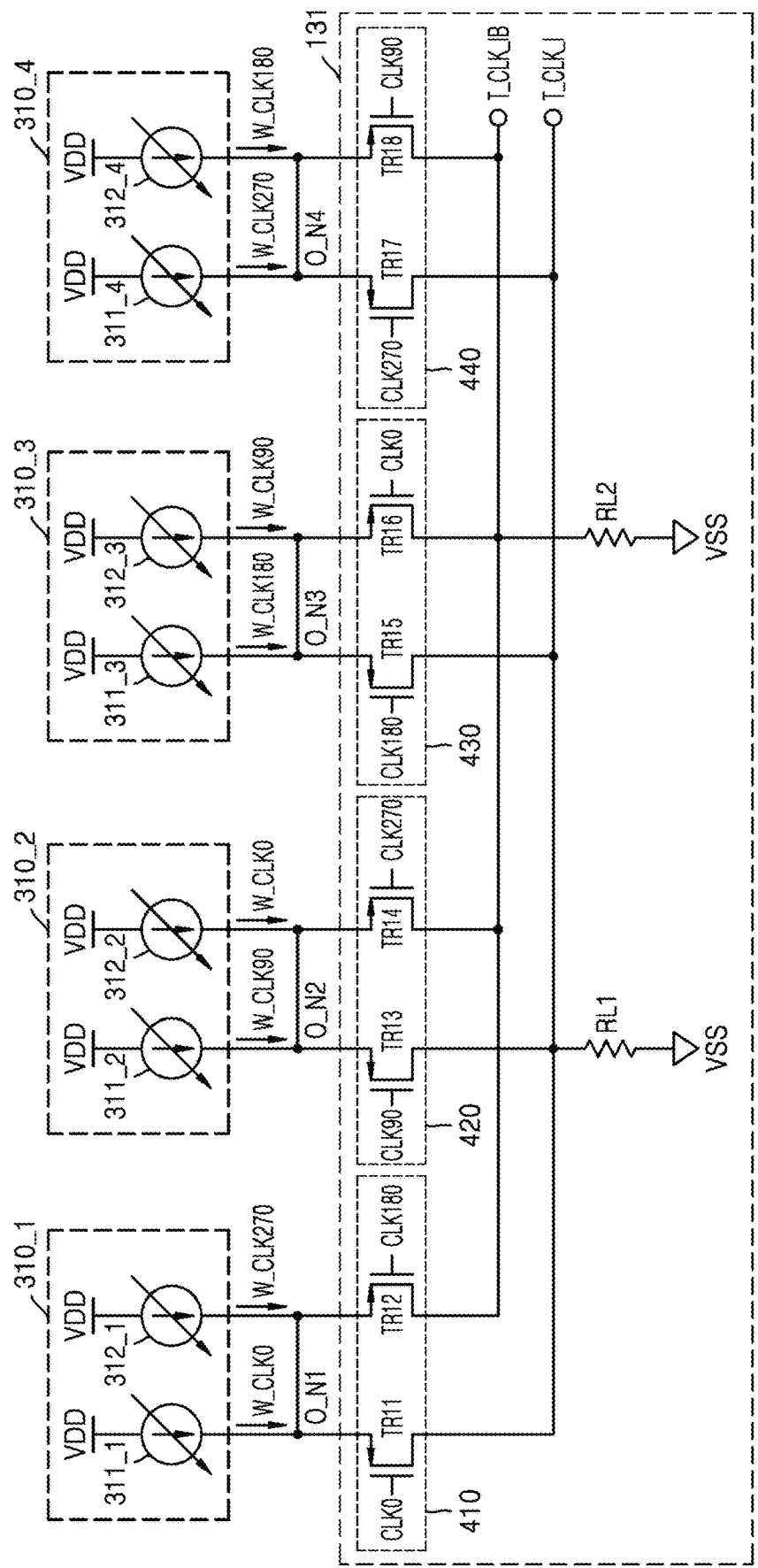
FIG. 7 is a circuit diagram illustrating an example of a first phase mixer included in the phase interpolator of FIG. 1 according to example embodiments.

FIG. 7 is a circuit diagram illustrating an example of a first phase mixer 131 included in the phase interpolator 100 of FIG. 1, according to example embodiments.

Referring to FIG. 7, a plurality of unit cells 310_1, 310_2, 310_3, and 310_4 may be conceptually illustrated to indicate that current magnitudes of the first to fourth target weight signals W_CLK0, W_CLK90, W_CLK180, and W_CLK270 are varied by the DAC 120, and that first to third weight signals are output.

In one embodiment, the DAC 120 may include first unit cells and second unit cells. The first unit cells are configured to adjust first and second weight signals having a phase difference of 90 degrees from among the first to third weight signals based on the first current, the second current, and the digital signal (PI_[127: 0]), and to output the first and second weight signals. The second unit cells are configured to adjust first and third weight signals having a phase difference of 90 degrees from among the first to third weight signals based on the first current, the second current, and the digital signal (PI_[127: 0]), and to output the first and third weight signals. For example, the unit cells 310_1 and 310_2 may output first, second, and fourth target weight signals W_CLK0, W_CLK90, and W_CLK270 as first and second unit cells, where the first weight signal is the first target weight signal W_CLK0, the second weight signal is the fourth target weight signal W_CLK270, and the third weight signal may correspond to the second target weight signal W_CLK90. Alternatively, the unit cells 310_2 and 310_3 may output first to third target weight signals W_CLK0, W_CLK90, and W_CLK180 as first and second unit cells, where the first weight signal is the second target weight signal W_CLK90, the second weight signal is the first target weight signal W_CLK0, and the third weight signal may correspond to the third target weight signal W_CLK180. Alternatively, the unit cells 310_3 and 310_4 may output second to fourth target weight signals W_CLK90, W_CLK180, and W_CLK270 as first and second unit cells, where the first weight signal is the third target weight signal W_CLK180, the second weight signal is the second target weight signal W_CLK90, and the third weight signal may correspond to the fourth target weight signal W_CLK270. Alternatively, the unit cells 310_4 and 310_1 may output first, third, and fourth target weight signals W_CLK0, W_CLK180, and W_CLK270 as first and second unit cells, where the first weight signal is the fourth target weight signal W_CLK270, the second weight signal is the third target weight signal W_CLK180, and the third weight signal may correspond to the first target weight signal W_CLK0.

In one embodiment, some of the plurality of unit cells 310_1, 310_2, 310_3, and 310_4 may include a first sub-cell for adjusting and outputting the first weight signal based on the first current and digital signal PI[127:0], and a second sub-cell for adjusting and outputting the second weight signal based on the second current and digital signal PI[127: 0]. In addition, the remaining unit cells of the plurality of unit cells 310_1, 310_2, 310_3, and 310_4 may include a third sub-cell for adjusting and outputting the first weight signal based on the first current and digital signal PI[127:0], and a fourth sub-cell for adjusting and outputting the third weight signal based on the second current and digital signal PI[127:0]. For example, the sub-cells 311_1, 312_1, 311_2, and 312_2 of the unit cells 310_1 and 310_2 may be first to fourth sub-cells. Alternatively, the sub-cells 311_2, 312_2, 311_3, and 312_3 of the unit cells 310_2 and 310_3 may be first to fourth sub-cells. Alternatively, the sub-cells 311_3, 312_3, 311_4, and 312_4 of the unit cells 310_3 and 310_4 may be first to fourth sub-cells. Alternatively, the sub-cells 311_1, 312_1, 311_4, and 312_4 of the unit cells 310_1 and 310_4 may be first to fourth sub-cells.

The first phase mixer 131 may include a first circuit 410, a second circuit 420, a third circuit 430, and a fourth circuit 440.

The first circuit 410 may be connected between the first output node O_N1 and each of a first terminal T_CLK_I and a second terminal T_CLK_IB, and may receive first and third input clock signals CLK0 and CLK180. The first and fourth target weight signals W_CLK0 and W_CLK270 may be input to the first output node O_N1. The first output clock signal CLK_I of FIG. 1 may be output from the first terminal T_CLK_I. The first inverted output clock signal CLK_IB of FIG. 1 corresponding to the first output clock signal CLK_I may be output from the second terminal T_CLK_IB. In an embodiment, the first circuit 410 may include a first transistor TR11 and a second transistor TR12. The first transistor TR11 may electrically connect the first output node O_N1 to the first terminal T_CLK_I based on the first input clock signal CLK0. The second transistor TR12 may electrically connect the first output node O_N1 to the second terminal T_CLK_IB based on the third input clock signal CLK180.

The second circuit 420 is connected between the second output node O_N2 and each of the first terminal T_CLK_I and the second terminal T_CLK_IB, and may receive second and fourth input clock signals CLK90 and CLK270. The first and second target weight signals W_CLK0 and W_CLK90 may be input to the second output node O_N2. In an embodiment, the second circuit 420 may include a third transistor TR13 and a fourth transistor TR14. The third transistor TR13 may electrically connect the second output node O_N2 to the first terminal T_CLK_I based on the second input clock signal CLK90. The fourth transistor TR14 may electrically connect the second output node O_N2 to the second terminal T_CLK_IB based on the fourth input clock signal CLK270.

The third circuit 430 may be connected between the third output node O_N3 and each of the first terminal T_CLK_I and the second terminal T_CLK_IB, and may receive first and third input clock signals CLK0 and CLK180. The second and third target weight signals W_CLK90 and W_CLK180 may be input to the third output node O_N3. In an embodiment, the third circuit 430 may include a fifth transistor TR15 and a sixth transistor TR16. The fifth transistor TR15 may electrically connect the third output node O_N3 to the first terminal T_CLK_I based on the third input clock signal CLK180. The sixth transistor TR16 may electrically connect the third output node O_N3 to the second terminal T_CLK_IB based on the first input clock signal CLK0.

The fourth circuit 440 is connected between the fourth output node O_N4 and each of the first terminal T_CLK_I and the second terminal T_CLK_IB, and may receive second and fourth input clock signals CLK90 and CLK270. The third and fourth target weight signals W_CLK180 and W_CLK270 may be input to the fourth output node O_N4. In an embodiment, the fourth circuit 440 may include a seventh transistor TR17 and an eighth transistor TR18. The seventh transistor TR17 may electrically connect the fourth output node O_N4 to the first terminal T_CLK_I based on the fourth input clock signal CLK270. The eighth transistor TR18 may electrically connect the fourth output node O_N4 to the second terminal T_CLK_IB based on the second input clock signal CLK90.

The first phase mixer 131 may further include first and second load resistors RL1 and RL2. The first terminal T_CLK_I may be connected to the first load resistor RL1, and the second terminal T_CLK_IB may be connected to the second load resistor RL2.

Figure 8:
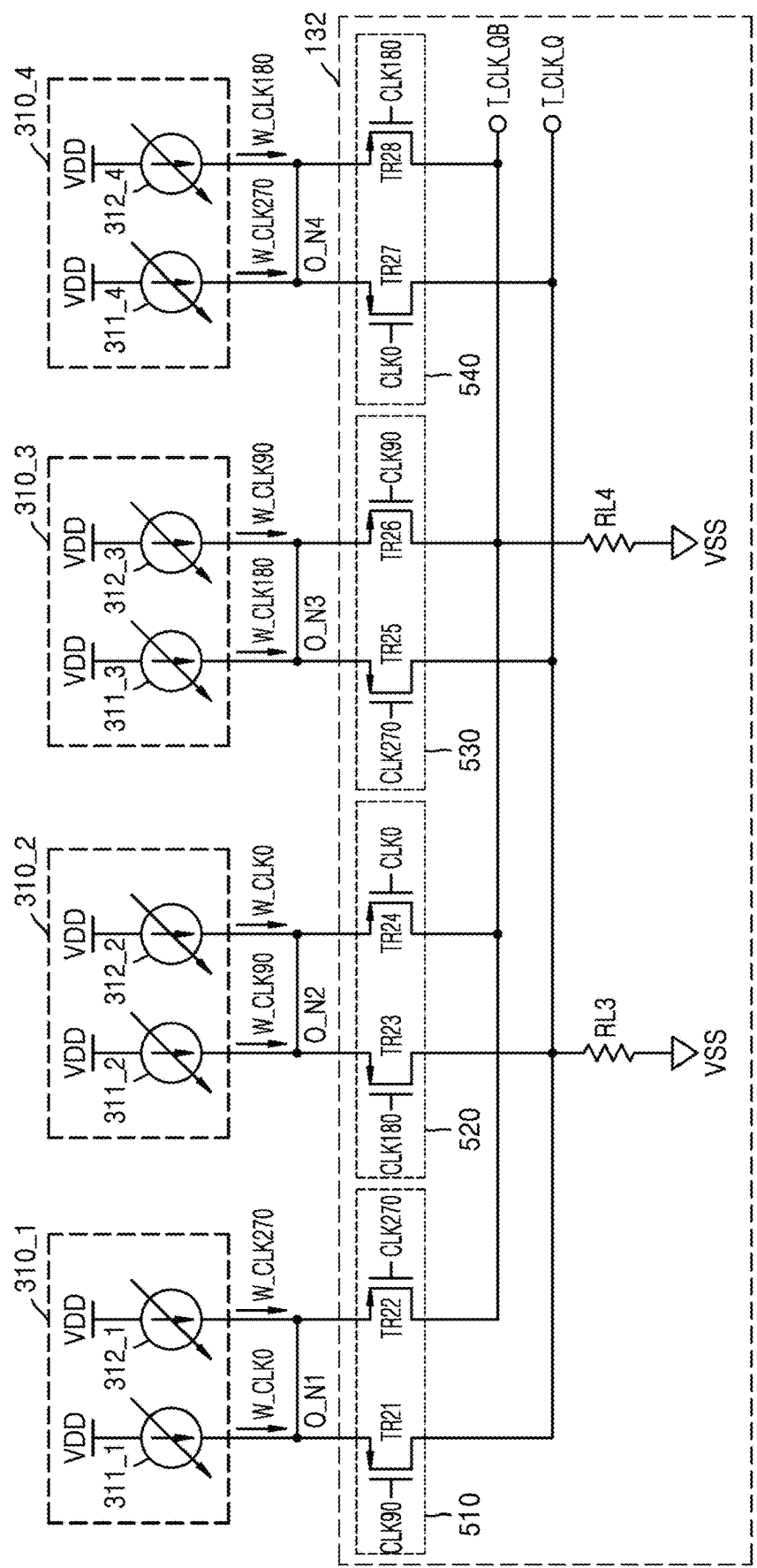
FIG. 8 is a circuit diagram illustrating an example of a second phase mixer included in the phase interpolator of FIG. 1 according to example embodiments.

FIG. 8 is a circuit diagram illustrating an example of a second phase mixer 132 included in the phase interpolator 100 of FIG. 1, according to example embodiments. Among the descriptions of the second phase mixer 132 of FIG. 8, a description of the same configuration as described above with reference to FIG. 7 is omitted.

Referring to FIG. 8, the plurality of unit cells 310_1, 310_2, 310_3, and 310_4 are the same as described above with reference to FIG. 7. The second phase mixer 132 may include a fifth circuit 510, a sixth circuit 520, a seventh circuit 530, and an eighth circuit 540.

The fifth circuit 510 is connected between the first output node O_N1 and each of the third terminal T_CLK_Q and the fourth terminal T_CLK_QB, and may receive the second and fourth input clock signals CLK90 and CLK270. The second output clock signal CLK_Q of FIG. 1 may be output to the third terminal T_CLK_Q. The second inverted output clock signal CLK_QB of FIG. 1 corresponding to the second output clock signal CLK_Q may be output to the fourth terminal T_CLK_QB. In an embodiment, the fifth circuit 510 may include a ninth transistor TR21 and a tenth transistor TR22. The ninth transistor TR21 may electrically connect the first output node O_N1 to the third terminal T_CLK_Q based on the second input clock signal CLK90. The tenth transistor TR22 may electrically connect the first output node O_N1 to the fourth terminal T_CLK_QB based on the fourth input clock signal CLK270.

The sixth circuit 520 is connected between the second output node O_N2 and each of the third terminal T_CLK_Q and the fourth terminal T_CLK_QB, and may receive first and third input clock signals CLK0 and CLK180. In an embodiment, the sixth circuit 520 may include an eleven-th transistor TR23 and a twelfth transistor TR24. The eleven-th transistor TR23 may electrically connect the second output node O_N2 to the third terminal T_CLK_Q based on the third input clock signal CLK180. The twelfth transistor TR24 may electrically connect the second output node O_N2 to the fourth terminal T_CLK_QB based on the first input clock signal CLK0.

The seventh circuit 530 is connected between the third output node O_N3 and each of the third terminal T_CLK_Q and the fourth terminal T_CLK_QB, and may receive second and fourth input clock signals CLK90 and CLK270. In an embodiment, the seventh circuit 530 may include a thirteen-th transistor TR25 and a fourteen-th transistor TR26. The thirteen-th transistor TR25 may electrically connect the third output node O_N3 to the third terminal T_CLK_Q based on the fourth input clock signal CLK270. The fourteen-th transistor TR26 may electrically connect the third output node O_N3 to the fourth terminal T_CLK_QB based on the second input clock signal CLK90.

The eighth circuit 540 is connected between the fourth output node O_N4 and each of the third terminal T_CLK_Q and the fourth terminal T_CLK_QB, and may receive first and third input clock signals CLK0 and CLK180. In an embodiment, the eighth circuit 540 may include a fifteen-th transistor TR27 and a sixteen-th transistor TR28. The fifteen-th transistor TR27 may electrically connect the fourth output node O_N4 to the third terminal T_CLK_Q based on the first input clock signal CLK0. The sixteen-th transistor TR28 may electrically connect the fourth output node O_N4 to the fourth terminal T_CLK_QB based on the third input clock signal CLK180.

The second phase mixer 132 may further include third and fourth load resistors RL3 and RL4. The third terminal T_CLK_Q may be connected to the third load resistor RL3, and the fourth terminal T_CLK_QB may be connected to the fourth load resistor RL4.

Figure 9:
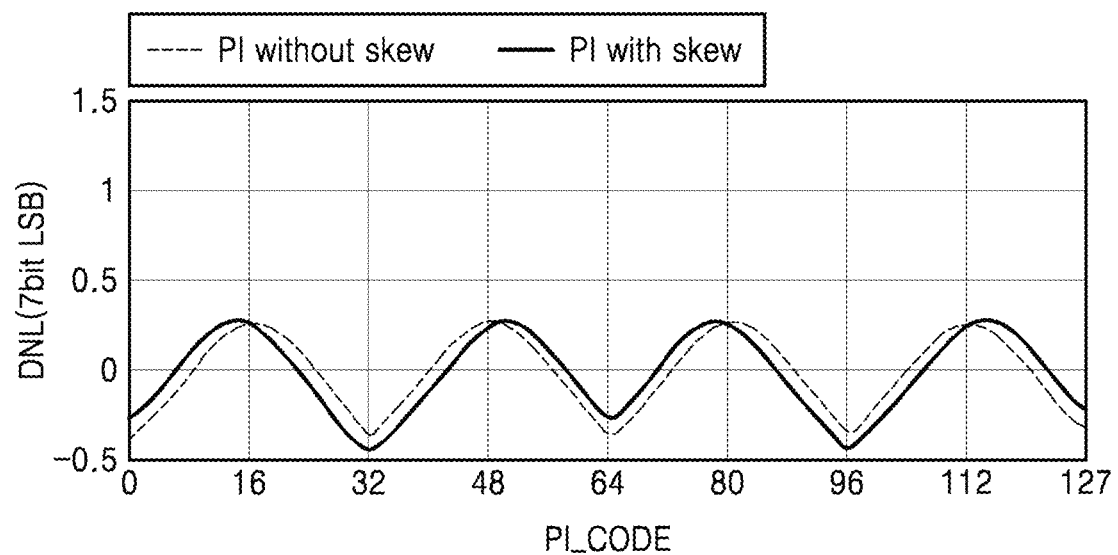
FIGS. 9, 10, and 11 are graphs showing differential non-linear (DNL), integral IL (INL), and phase errors according to a phase interpolation code, respectively, according to example embodiments.
Figure 10:
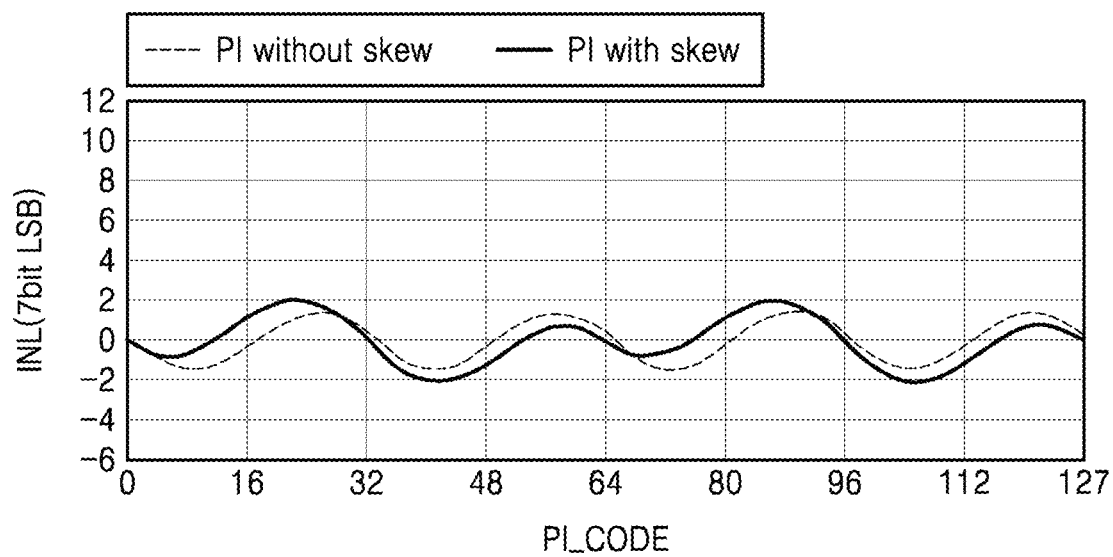
Figure 11:
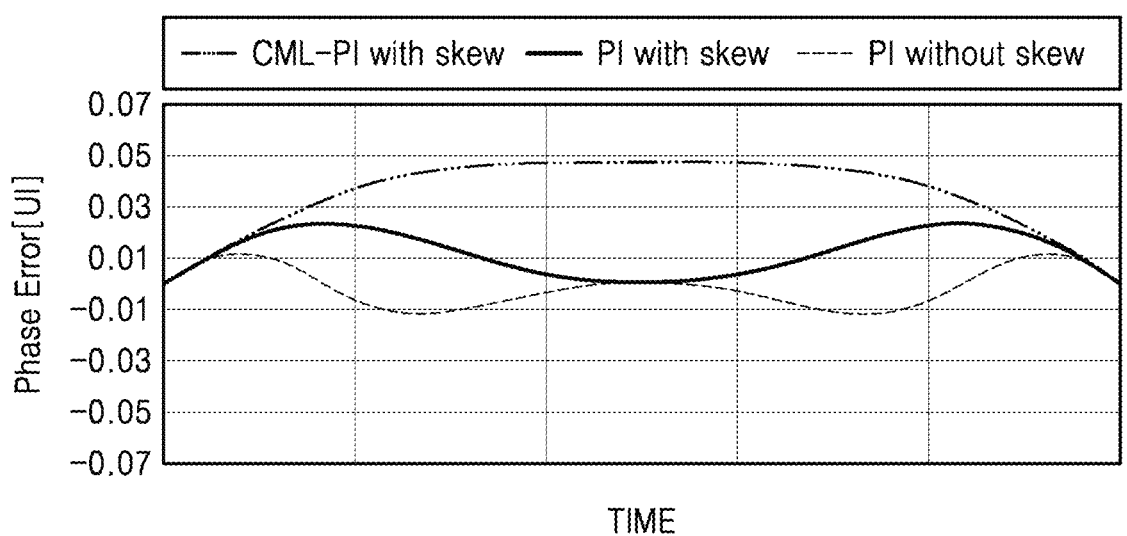

FIGS. 9, 10, and 11 are graphs showing differential non-linearity (DNL), integral NL (INL), and phase errors according to a phase interpolation code, respectively.

Referring to FIG. 9, according to the phase interpolation code PI_CODE, the general shapes of the DNL for the phase interpolator 100 having a skew (e.g., a phase skew IQ_SKEW) and the DNL for the phase interpolator 100 without a skew may be similar to each other, and may have a value between −0.5 and 0.5. For example, the phase interpolator 100 of the embodiment may have relatively improved differential non-linearity (DNL) performance and may be implemented with a relatively small size.

Referring to FIG. 10, according to the phase interpolation code PI_CODE, the INL for the phase interpolator 100 having a skew (e.g., a phase skew IQ_SKEW) and the INL for the phase interpolator 100 without a skew may have a value between −2 and 2.

Referring to FIG. 11, current mode logic (CML)-PI in FIG. 11 is a phase interpolator according to a comparative example, and it is assumed that there is a phase skew. A phase error that may occur in the phase interpolator 100 with or without a skew may be less than a phase error that may occur in a CML-PI with a skew. In FIG. 11, a vertical axis represents a phase error in a unit interval (UI).

Figure 12:
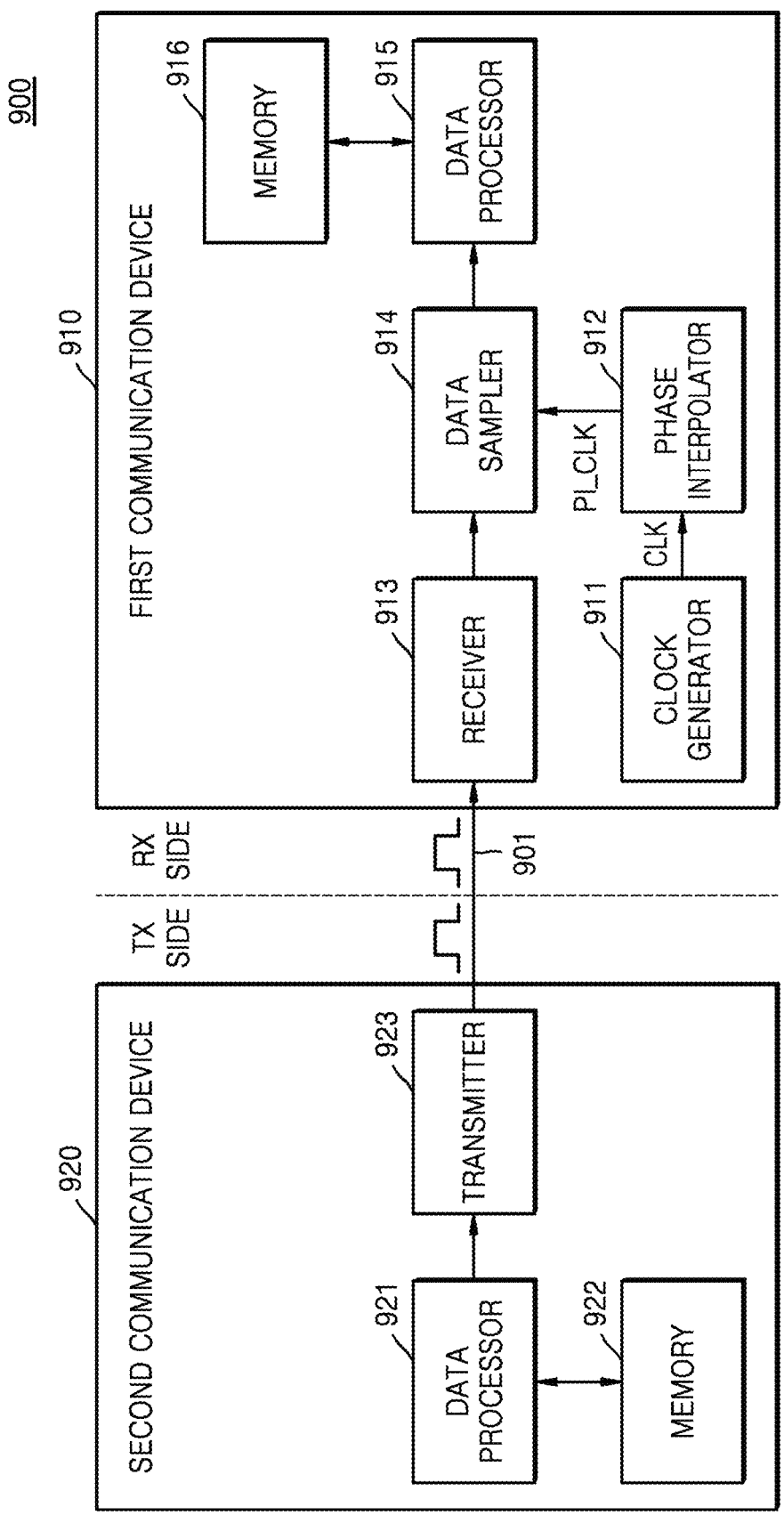
FIG. 12 is a block diagram illustrating a communication device and a communication system including the same, according to example embodiments.

FIG. 12 is a block diagram illustrating a communication device and a communication system 900 including the same, according to example embodiments.

Referring to FIG. 12, the communication system 900 may include a communication channel 901, a first communication device 910, and a second communication device 920. The first communication device 910 and the second communication device 920 may perform communication operations with each other. For example, the first communication device 910 and the second communication device 920 may be processing devices including computers, network elements (e.g., routers, switches), portable communication devices, and the like.

The first communication device 910 includes a phase interpolator 912 and a data sampler 914, and may further include a clock generator 911, a receiver 913, a data processor 915, and a memory 916. The second communication device 920 may include a data processor 921, a memory 922, and a transmitter 923. For example, the data processors 915 and 921 may be microprocessors or central processing units (CPUs). For example, the memories 916 and 922 may include synchronous random access memories (SRAMs), dynamic RAMs (DRAMs), Synchronous DRAMs (SDRAMs), Double data rate SDRAMs (DDR SDRAMs), and the like.

The data processor 921 of the second communication device 920 may perform a data processing operation on data to be transmitted using the memory 922, and the transmitter 923 may output data on which the data processing operation has been performed through the channel 901 in the form of a data stream.

The receiver 913 of the first communication device 910 may receive an input data stream and provide the input data stream to the data sampler 914. The clock generator 911 may generate a plurality of input clock signals CLK based on a crystal reference clock signal received from the outside. For example, the clock generator 911 may include a phase locked loop (PLL) circuit and/or a delay locked loop (DLL) circuit. The phase interpolator 912 may generate a phase interpolation clock signal PI_CLK based on a control signal CS (e.g., a phase interpolation code PI_CODE) and the plurality of input clock signals CLK. The phase interpolator 912 is a phase interpolator according to embodiments, and may be implemented as described above with reference to FIGS. 1 to 8. The data sampler 914 may generate sample data by sampling the input data stream based on the phase interpolation clock signal PI_CLK. For example, the data sampler 914 may perform a data sampling operation multiple times to generate sample data. The data processor 915 may perform a data processing operation on sample data using the memory 916.

Figure 13:
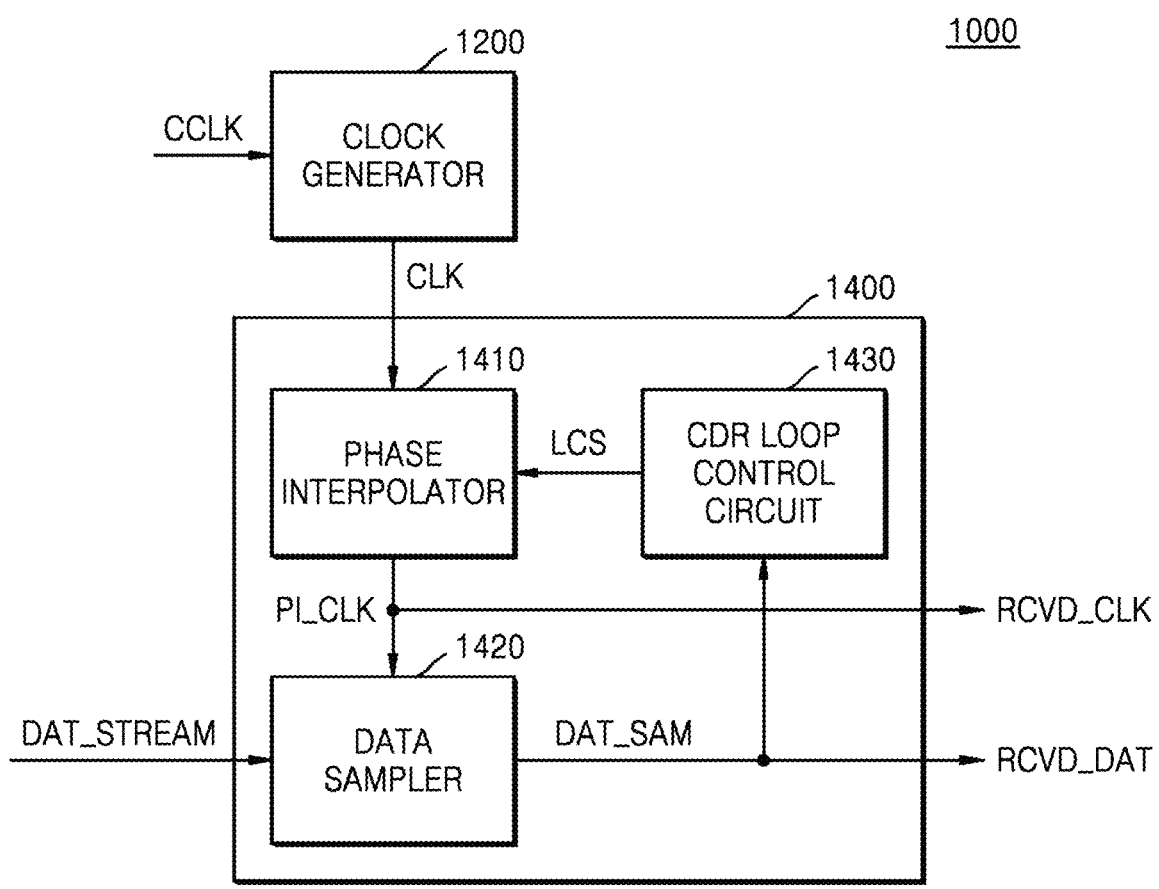
FIG. 13 is a block diagram illustrating a clock data recoverer and a communication device including the same, according to example embodiments.

FIG. 13 is a block diagram illustrating a clock data recoverer 1400 and a communication device 1000 including the same, according to example embodiments.

Referring to FIG. 13, the communication device 1000 may include a clock generator 1200 and the clock data recoverer 1400. For example, the communication device 1000 may be a clock and data recovery (CDR) device. The clock data recoverer 1400 may be referred to as a CDR loop circuit. The clock data recoverer 1400 may include a phase interpolator 1410, a data sampler 1420, and a CDR loop controller 1430.

The clock generator 1200 may generate a plurality of input clock signals CLK based on a crystal reference clock signal CCLK received from the outside. For example, the clock generator 1200 may include a PLL circuit and/or a DLL circuit. The phase interpolator 1410 may generate a phase interpolation clock signal PI_CLK based on a loop control signal LCS (e.g., a phase interpolation code PI_CODE) received from the CDR loop controller 1430 and the plurality of input clock signals CLK. The phase interpolator 1410 is a phase interpolator according to embodiments, and may be implemented as described above with reference to FIGS. 1 to 8. The data sampler 1420 may receive an input data stream DAT_STREAM from the outside and perform a sampling operation based on the phase interpolation clock signal PI_CLK to generate sample data DAT_SAM.

The CDR loop controller 1430 may output a control signal (e.g., a loop control signal LCS) based on the sampling result of the data sampler 1420. The CDR loop controller 1430 may generate a loop control signal LCS based on a result of performing the clock and the data recovery operation. Specifically, the CDR loop controller 1430 may determine whether the phase interpolation clock signal PI_CLK generated from the phase interpolator 1410 is located at the center of the sample data DAT_SAM using the 4 phases sample data DAT_SAM, and generate a loop control signal LCS based on the determination result. Through the CDR loop operation described above, the phase interpolator 1410 may generate and provide the recovery clock signal RCVD_CLK to the data sampler 1420, and the data sampler 1420 may generate the recovery data RCVD_DAT using the recovery clock signal RCVD_CLK. As described above, the clock data recoverer 1400 may generate the recovery clock signal RCVD_CLK and the recovery data RCVD_DAT and provide the generated recovery clock signal RCVD_DAT and recovery data RCVD_DAT to an external data processor. The CDR loop controller 1430 may be referred to as a CDR loop control circuit.

Figure 14:
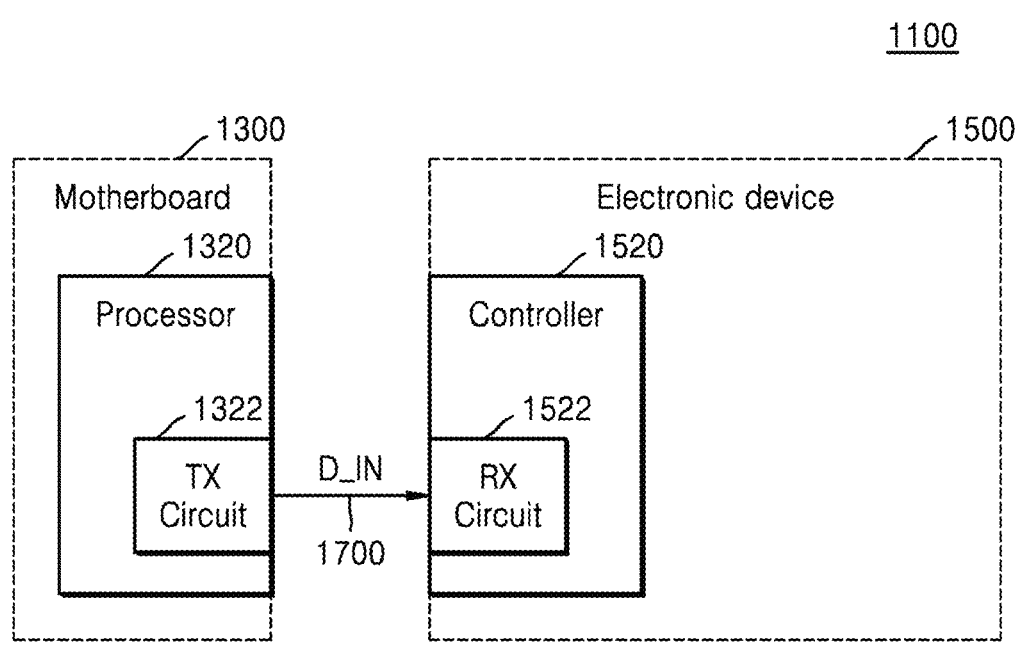
FIG. 14 is a block diagram illustrating a computing system according to embodiments.

FIG. 14 is a block diagram illustrating a computing system 1100 according to example embodiments.

Referring to FIG. 14, as a non-limiting example, the computing system 1100 may be a stationary system such as a desktop computer, a server, a TV, an electronic board, or a mobile system such as a laptop computer, a mobile phone, a tablet personal computer (PC), a wearable device, etc. The computing system 1100 may include a motherboard 1300 and an electronic device 1500, and input data D_IN may be transmitted from the motherboard 1300 to the electronic device 1500 through a data line 1700.

The motherboard 1300 may include a processor 1320, and the processor 1320 may include a transmission (TX) circuit 1322. A clock data recovery circuit according to an embodiment may be included in a reception (RX) circuit 1522. The processor 1320 may refer to a processing unit that performs computational operations such as a microprocessor, a microcontroller, an application specific integrated circuit (ASIC), and a field programmable gate array (FPGA). The transmission circuit 1322 may output the input data D_IN to the reception circuit 1522 for the clock data recovery operation of the reception circuit 1522.

The electronic device 1500 may include a controller 1520. The controller 1520 may receive input data D_IN from the motherboard 1300, and may perform a clock data recovery operation by using the input data D_IN. The controller 1520 may include the reception circuit 1522, and the reception circuit 1522 may receive the input data D_IN. The reception circuit 1522 may include a clock data recoverer according to embodiments, the clock data recoverer may include a phase interpolator according to embodiments, and the phase interpolator included in the reception circuit 1522 may be implemented as described above with reference to FIGS. 1 to 8.

Figure 15:
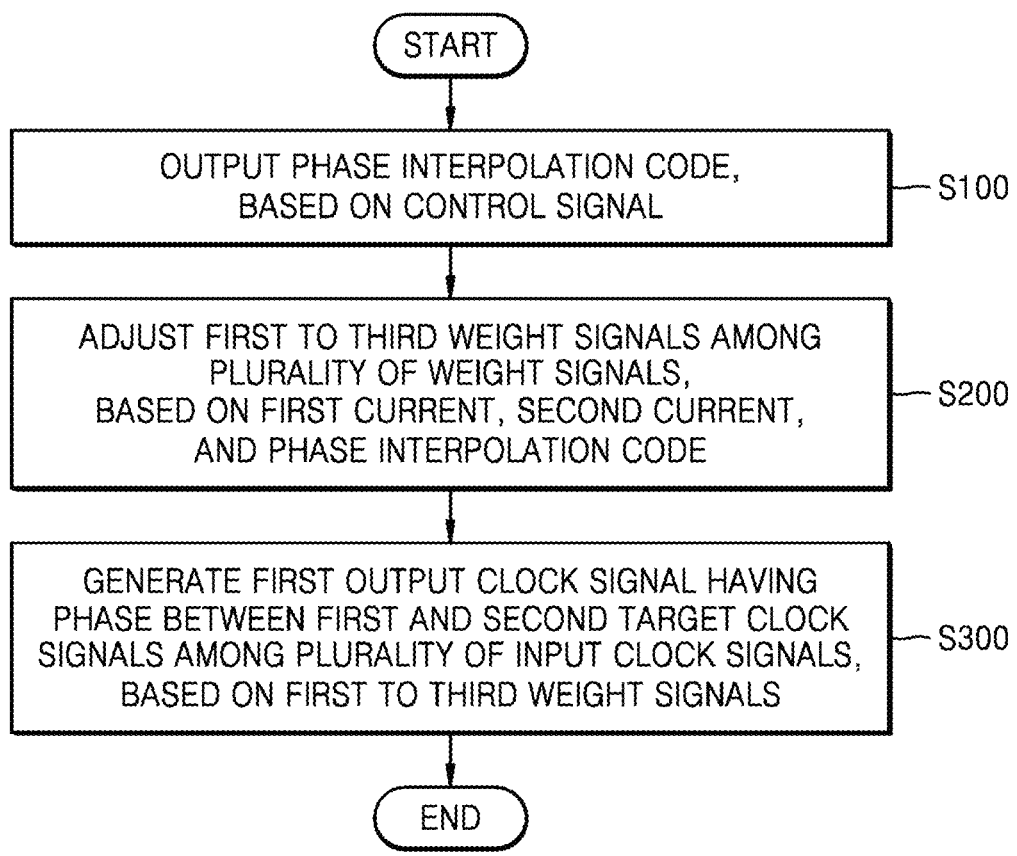
FIG. 15 is a flowchart illustrating an operating method of a phase interpolator according to example embodiments.

FIG. 15 is a flowchart illustrating a method of operating a phase interpolator according to example embodiments.

Referring to FIGS. 1 and 15, an operation S100 of outputting a digital signal PI[127:0] is performed based on a control signal CS.

An operation S200 of adjusting first to third weight signals among the plurality of target weight signals is performed based on a first current, a second current, and the digital signal PI[127: 0].

In an embodiment of operation S200, operation S200 may include adjusting first and second weight signals having a phase difference of 90 degrees from each other among the first to third weight signals based on the first current, the second current, and the digital signal PI[127:0], and adjusting first and third weight signals having a phase difference of 90 degrees from each other among the first to third weight signals based on the first current, the second current, and the digital signal PI[127:0].

According to an embodiment, in the operation of adjusting the first and second weight signals, the adjusting of the first and second weight signals may include: adjusting the first weight signal based on the first current and the digital signal PI[127: 0]; and adjusting the second weight signal based on the second current and the digital signal PI[127: 0].

According to an embodiment, in the operation of adjusting the first and third weight signals, the adjusting of the first and third weight signals may include: adjusting the first weight signal based on the first current and the digital signal PI[127: 0]; and adjusting the third weight signal based on the second current and the digital signal PI[127: 0].

An operation S300 of generating a first output clock signal having a phase between first and second target clock signals among a plurality of input clock signals based on the first to third weight signals is performed.

In an embodiment, the method of operating the phase interpolator may further include an operation of generating a second output clock signal having a phase 90 degrees ahead of the phase of the first output clock signal between the third and fourth target clock signals among the plurality of input clock signals based on the first to third weight signals.

In an embodiment, a difference between the phase of the first weight signal and the phase of the second weight signal among the first to third weight signals may be 90 degrees, a difference between the phase of the first weight signal and the phase of the third weight signal may be 90 degrees, and a difference between the phase of the second weight signal and the phase of the third weight signal may be 180 degrees.

In an embodiment, the magnitude of each of the first current and the second current may be half of the unit current.

It is obvious to those skilled in the art that the structure of the inventive concept may be variously modified or changed without departing from the scope or technical idea of the inventive concept. In view of the foregoing, if modifications and changes of the present disclosure fall within the scope of the claims and equivalents below, it is believed that the present disclosure includes variations and modifications of this disclosure.

While the inventive concept has been particularly shown and described with reference to embodiments thereof, it will be understood that various changes in form and details may be made therein without departing from the spirit and scope of the present invention as defined in the following claims.

What is claimed is:

1. A phase interpolator comprising:
a decoder configured to output a digital signal based on a control signal;
a digital-to-analog converter (DAC) configured to, based on a first current, a second current, and the digital signal:
adjust first to third weight signals among a plurality of target weight signals, and
output the first to third weight signals; and
a first phase mixer configured to:
determine first and second target clock signals among a plurality of input clock signals, and
based on the first to third weight signals, generate a first output clock signal having a phase between the first and second target clock signals.

2. The phase interpolator of claim 1, wherein the DAC comprises:
a plurality of first unit cells configured to, based on the first current, the second current, and the digital signal:
adjust the first and second weight signals having a phase difference of 90 degrees from among the first to third weight signals, and
output the first and second weight signals; and
a plurality of second unit cells configured to, based on the first current, the second current, and the digital signal:
adjust the first and third weight signals having a phase difference of 90 degrees from among the first to third weight signals, and
output the first and third weight signals.

3. The phase interpolator of claim 2, wherein each of the plurality of first unit cells comprises:
a first sub-cell configured to, based on the first current and the digital signal:
adjust the first weight signal, and
output the first weight signal; and
a second sub-cell configured to, based on the second current and the digital signal:
adjust the second weight signal, and
output the second weight signal.

4. The phase interpolator of claim 3, wherein the first sub-cell comprises:
a first current source configured to provide the first current based on a power supply voltage; and
a first transistor group connected between each of a plurality of output nodes and the first current source, and the first transistor group configured to, based on the digital signal, electrically connect the first current source to each of the output nodes, and wherein the second sub-cell comprises:
a second current source configured to provide the second current based on the power supply voltage; and
a second transistor group connected between each of the plurality of output nodes and the second current source, and the second transistor group configured to, based on the digital signal, electrically connect the second current source to each of the output nodes.

5. The phase interpolator of claim 2, wherein each of the plurality of second unit cells comprises:
a third sub-cell configured to, based on the first current and the digital signal:
adjust the first weight signal, and
output the first weight signal; and
a fourth sub-cell configured to, based on the second current and the digital signal:
adjust the third weight signal, and
output the third weight signal.

6. The phase interpolator of claim 1, wherein the first phase mixer comprises:
a first circuit connected between a first output node configured to receive first and fourth target weight signals of the plurality of target weight signals and each of a first terminal configured to output the first output clock signal and a second terminal configured to output a first inverted output clock signal corresponding to the first output clock signal, and the first circuit configured to receive first and third input clock signals among the plurality of input clock signals;
a second circuit connected between a second output node configured to receive the first target weight signal and a second target weight signal of the plurality of target weight signals and each of the first terminal and the second terminal, and the second circuit configured to receive second and fourth input clock signals among the plurality of input clock signals;
a third circuit connected between a third output node configured to receive the second target weight signal and a third target weight signal of the plurality of target weight signals and each of the first terminal and the second terminal, and the third circuit configured to receive the first and third input clock signals; and
a fourth circuit connected between a fourth output node configured to receive the third and fourth target weight signals and each of the first terminal and the second terminal, and the fourth circuit configured to receive the second and fourth input clock signals.

7. The phase interpolator of claim 1, further comprising:
a second phase mixer configured to:
determine third and fourth target clock signals among the plurality of input clock signals, and
based on the first to third weight signals, generate a second output clock signal having a phase which is 90 degrees earlier than the phase of the first output clock signal and between the third and fourth target clock signals.

8. The phase interpolator of claim 7, wherein the second phase mixer comprises:
a fifth circuit connected between a first output node configured to receive first and fourth target weight signals of the plurality of target weight signals and each of a third terminal configured to output the second output clock signal and a fourth terminal configured to output a second inverted output clock signal corresponding to the second output clock signal, and the fifth circuit configured to receive second and fourth input clock signals among the plurality of input clock signals;

a sixth circuit connected between a second output node configured to receive the first target weight signal and a second target weight signal of the plurality of target weight signals and each of the third terminal and the fourth terminal, and the sixth circuit configured to receive first and third input clock signals among the plurality of input clock signals;

a seventh circuit connected between a third output node configured to receive the second target weight signal and a third target weight signal of the plurality of target weight signals and each of the third terminal and the fourth terminal, and the seventh circuit configured to receive the second and fourth input clock signals; and an eighth circuit connected between a fourth output node configured to receive the third and fourth target weight signals and each of the third terminal and the fourth terminal, and the eighth circuit configured to receive second and third input clock signals.

9. A clock data recoverer comprising:
a phase interpolator configured to generate a phase interpolation clock signal based on a control signal and a plurality of input clock signals;
a data sampler configured to, based on the phase interpolation clock signal, sample an input data stream and to generate sample data; and
a clock data restoring loop controller configured to, based on a sampling result of the data sampler, output the control signal, wherein:
the phase interpolator comprises:
a decoder configured to output a digital signal based on the control signal;
a digital-to-analog converter (DAC) configured to, based on a first current, a second current, and the digital signal:
adjust first to third weight signals among a plurality of target weight signals, and
output the first to third weight signals; and
a first phase mixer configured to:
determine first and second target clock signals among a plurality of input clock signals, and
based on the first to third weight signals, generate a first output clock signal having a phase between the first and second target clock signals as the phase interpolation clock signal.

10. The clock data recoverer of claim 9, wherein the DAC comprises:
a plurality of first unit cells configured to, based on the first current, the second current, and the digital signal:
adjust the first and second weight signals having a phase difference of 90 degrees from among the first to third weight signals, and
output the first and second weight signals; and
a plurality of second unit cells configured to, based on the first current, the second current, and the digital signal:
adjust the first and third weight signals having a phase difference of 90 degrees from among the first to third weight signals, and
output the first and third weight signals.

11. The clock data recoverer of claim 10, wherein each of the plurality of first unit cells comprises:
a first sub-cell configured to, based on the first current and the digital signal:
adjust the first weight signal, and
output the first weight signal; and
a second sub-cell configured to, based on the second current and the digital signal:
adjust the second weight signal, and
output the second weight signal.

12. The clock data recoverer of claim 11, wherein the first sub-cell comprises:
a first current source configured to provide the first current based on a power supply voltage; and
a first transistor group connected between each of a plurality of output nodes and the first current source, and the first transistor group configured to, based on the digital signal, electrically connect the first current source to each of the output nodes, and
wherein the second sub-cell comprises:
a second current source configured to provide the second current based on the power supply voltage; and
a second transistor group connected between each of the plurality of output nodes and the second current source, and the second transistor group configured to, based on the digital signal, electrically connect the second current source to each of the output nodes.

13. The clock data recoverer of claim 10, wherein each of the plurality of second unit cells comprises:
a third sub-cell configured to, based on the first current and the digital signal:
adjust the first weight signal, and
output the first weight signal; and
a fourth sub-cell configured to, based on the second current and the digital signal:
adjust the third weight signal, and
output the third weight signal.

14. The clock data recoverer of claim 9, wherein the first phase mixer comprises:
a first circuit connected between a first output node configured to receive first and fourth target weight signals of the plurality of target weight signals and each of a first terminal configured to output the first output clock signal and a second terminal configured to output a first inverted output clock signal corresponding to the first output clock signal, and the first circuit configured to receive first and third input clock signals among the plurality of input clock signals;
a second circuit connected between a second output node configured to receive the first target weight signal and a second target weight signal of the plurality of target weight signals and each of the first terminal and the second terminal, and the second circuit configured to receive second and fourth input clock signals among the plurality of input clock signals;
a third circuit connected between a third output node configured to receive the second target weight signal and a third target weight signal of the plurality of target weight signals and each of the first terminal and the second terminal, and the third circuit configured to receive the first and third input clock signals; and
a fourth circuit connected between a fourth output node configured to receive the third and fourth target weight signals and each of the first terminal and the second terminal, and the fourth circuit configured to receive the second and fourth input clock signals.

15. The clock data recoverer of claim 9, further comprising:
a second phase mixer configured to:
determine third and fourth target clock signals among the plurality of input clock signals, and
based on the first to third weight signals, generate, as the phase interpolation clock signal, a second output clock signal having a phase which is 90 degrees earlier than the phase of the first output clock signal and between the third and fourth target clock signals.

16. A communication device comprising:
  a clock generator configured to generate a plurality of input clock signals based on a crystal reference clock signal received from outside the communication device;
  a phase interpolator configured to generate a phase interpolation clock signal based on a control signal and the plurality of input clock signals; and
  a data sampler configured to, based on the phase interpolation clock signal, sample an input data stream, and generate sample data, wherein:
  the phase interpolator comprises:
  a decoder configured to output a digital signal based on the control signal;
  a digital-to-analog converter (DAC) configured to, based on a first current, a second current, and the digital signal:
  adjust first to third weight signals among a plurality of target weight signals, and
  output the first to third weight signals; and
  a first phase mixer configured to:
  determine first and second target clock signals among a plurality of input clock signals, and
  based on the first to third weight signals, generate a first output clock signal having a phase between the first and second target clock signals as the phase interpolation clock signal.

17. The communication device of claim 16, wherein the DAC comprises:
  a plurality of first unit cells configured to, based on the first current, the second current, and the digital signal:
  adjust the first and second weight signals having a phase difference of 90 degrees from among the first to third weight signals, and
  output the first and second weight signals; and
  a plurality of second unit cells configured to, based on the first current, the second current, and the digital signal:
  adjust the first and third weight signals having a phase difference of 90 degrees from among the first to third weight signals, and
  output the first and third weight signals.

18. The communication device of claim 17, wherein each of the plurality of first unit cells comprises:
  a first sub-cell configured to, based on the first current and the digital signal:
  adjust the first weight signal, and
  output the first weight signal; and
  a second sub-cell configured to, based on the second current and the digital signal:
  adjust the second weight signal, and
  output the second weight signal.

19. The communication device of claim 17, wherein each of the plurality of second unit cells comprises:
  a third sub-cell configured to, based on the first current and the digital signal:
  adjust the first weight signal, and
  output the first weight signal; and
  a fourth sub-cell configured to, based on the second current and the digital signal:
  adjust the third weight signal, and
  output the third weight signal.

20. The communication device of claim 16, further comprising:
  a second phase mixer configured to:
  determine third and fourth target clock signals among the plurality of input clock signals, and
  based on the first to third weight signals, generate, as the phase interpolation clock signal, a second output clock signal having a phase which is 90 degrees earlier than the phase of the first output clock signal and between the third and fourth target clock signals.

* * * * *